June 2, 1931.        P. C. CARLSTON        1,807,586
AUTOMATIC SHUT-OFF DEVICE
Filed Sept. 13, 1927
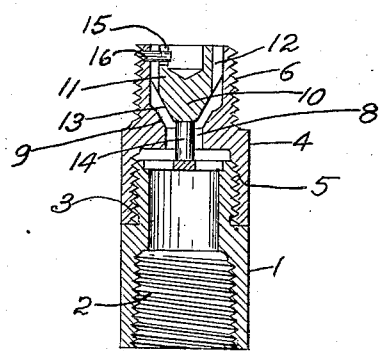
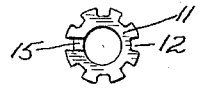
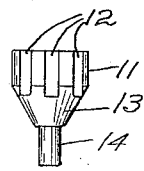
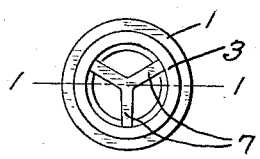
INVENTOR:
P. C. Carlston
BY
Murray O. Hayes
ATTORNEY.

Patented June 2, 1931

1,807,586

UNITED STATES PATENT OFFICE

PETER C. CARLSTON, OF SALT LAKE CITY, UTAH

AUTOMATIC SHUT-OFF DEVICE

Application filed September 13, 1927. Serial No. 219,324.

This invention relates to an automatic shut off valve which will stop the flow of fluid through it when the parts thereof are disassembled, and has among its objects:

First: To provide a device of the kind named which will be of universal application.

Second: To invent a shut-off valve which may be applied to faucets already installed.

Third: To devise a shut-off which will occupy little space, be easy to apply and cheap to make.

In the drawings:

Fig. 1 is a longitudinal sectional view of my invention assembled taken on the line 1—1, Fig. 2;

Fig. 2 is an end view of my device;

Fig. 3 is an end view of the valve proper;

Fig. 4 is a side view of said valve.

It is very undesirable to be compelled to shut all the water out of a building when it becomes necessary to repair a leaky faucet. Many devices have been tried but inasmuch as they are specifically adapted for use with a particular type of faucet, or are built into the faucet they are expensive to make and likely to get out of order. The present invention was made to solve this problem.

My device comprises two major parts, one of which carries the valve and the seat therefor, the other the means for retaining the valve in an unseated position during normal operation of the line in which it is used.

The member 1 has a female thread at 2 and a reduced male threaded portion at 3; member 4 has a female threaded portion 5 and a reduced male threaded portion 6.

Adjacent the outer end of portion 3 radially extending members 7 are carried by 1. Within member 4 is an aperture 8 whereof the walls adjoin the frusto-conical internal surface 9 which forms a valve seat.

The valve proper, designated by 10, has a substantially cylindrical portion 11 with longitudinal grooves 12, a frusto-conical surface 13 and carries an extension 14. A radial slot 15 is provided to accommodate a stop pin 16, but this is not essential as the end of valve 10 could be made plane and the pin merely extend into the space in member 4 adjacent to said valve. The free end of portion 10 is preferably made somewhat concave as the action thereof is thus rendered a little more positive than if the end is plane, although any conformation given thereto would in most cases function perfectly. However, the construction shown, with pin 16 extending into valve 10 permits of shortening member 4 and thus economizes material and space in installation.

Valve 10 is placed inside member 4 in such manner that surface 13 may contact surface 9; preferably these said surfaces have a ground fit. Slot 15 is made to register with the hole provided for pin 16, and the pin is then inserted.

In use threaded portion 6 is screwed into a sleeve or other suitable fitting, so disposed that the fluid passing through goes by way of grooves 12 through aperture 8 into member 1, i. e. so that the fluid pressure tends to force valve 10 against seat 9. Threaded portion 3 is engaged with the threads of portion 5, and thus members 7 are caused to contact stem 14 and hold valve 10 unseated. Any type of faucet or bibb or other device may be screwed into threaded portion 2 of member 1.

In case it becomes necessary to repair or replace a device used in connection with my invention all that is necessary is to disengage member 1 from member 4; this permits the fluid pressure to seat valve 10 and the flow thereof is thus completely stopped.

While my invention has been specifically mentioned in connection with a faucet or similar device it may be connected with a hose, pipe, or any other means or device used to control or conduct fluids. In case more freedom of the flow is demanded, all that is necessary is to make the passages of such capacity that the requisite quantity of fluid may pass.

The advantage to be gained by using my invention in large apartment houses or office buildings is obvious, as any outlet needing repair can be cared for without in any way disturbing the fluid supply to any other outlet. Its convenience in the individual house is also great.

The term fluid has been used as my device may be used on lines carrying water, steam, air, gas, oil, etc.

I claim:

An automatic shut-off device, comprising a first hollow body member, internal threads at one end thereof, the other end thereof being of reduced size and externally threaded, members extending radially across the bore of said other end, a second body member, also substantially cylindrical, internal threads in one end of said second body member adapted to engage the external threads on the first body member, a reduced externally threaded portion at the other end of said second body member, a radially extending wall across the bore of said second body member at the juncture of the two said portions thereof, there being an aperture formed therethrough and a frusto-conical valve seat formed therein, a valve comprising a stem adapted to extend through the said aperture and a frusto-conical portion adapted to contact said valve seat and a longitudinally grooved cylindrical body portion, said body portion of the valve having a slot therein, and a pin extending through the second body portion and into said slot.

In witness whereof I affix my signature.

PETER C. CARLSTON.